United States Patent [19]
Patton et al.

[11] Patent Number: 5,530,517
[45] Date of Patent: Jun. 25, 1996

[54] METHOD FOR COMMUNICATING SCENE ORIENTATION OF CAMERA FILM TO PHOTO FINISHING EQUIPMENT

[75] Inventors: David L. Patton, Webster; Stephen J. Rowan, Spencerport; Joseph A. Manico, Rochester, all of N.Y.

[73] Assignee: Eastman Kodak Company, Rochester, N.Y.

[21] Appl. No.: 369,942

[22] Filed: Jan. 9, 1995

[51] Int. Cl.⁶ .......................... G03B 27/52; G03B 27/32
[52] U.S. Cl. .................. 355/40; 355/41; 355/77; 354/105; 235/494; 235/462
[58] Field of Search .................. 354/105, 354, 354/106, 109; 355/40, 41, 77; 235/462, 454, 494; 250/548, 570

[56] References Cited

U.S. PATENT DOCUMENTS

| | | | |
|---|---|---|---|
| 4,659,213 | 4/1987 | Matsumoto | 355/40 |
| 4,800,406 | 1/1989 | Signoretto | 354/105 |
| 4,821,061 | 4/1989 | Gudmundson et al. | 355/40 |
| 5,122,832 | 6/1992 | Iwashita et al. | 355/41 |
| 5,241,166 | 8/1993 | Chandler | 235/494 |
| 5,248,887 | 9/1993 | Oberhardt | 250/548 |
| 5,301,036 | 4/1994 | Barrett et al. | 358/448 |
| 5,450,149 | 9/1995 | Cocca | 354/106 |
| 5,488,049 | 9/1995 | Shafer et al. | 235/462 |

*Primary Examiner*—D. Rutledge
*Attorney, Agent, or Firm*—Cumpston & Shaw

[57] ABSTRACT

A method is described for communicating the scene orientation of an exposed strip of left or right hand load photographic film to photo finishing equipment to enable imaging parameters to be set automatically which includes the steps of splicing a first exposed strip of film to a second exposed strip of film with a film-splicing label, encoding the label for left or right hand load of the second film with low resolution indicia, and feeding the spliced first and second films to a film-splicing label reader for reading the code and automatically setting the parameters for normal or inverted scene orientation. A film-splicing label encoded with indicia for identifying the scene orientation and a method for splicing strips of film with the label are also provided.

33 Claims, 3 Drawing Sheets

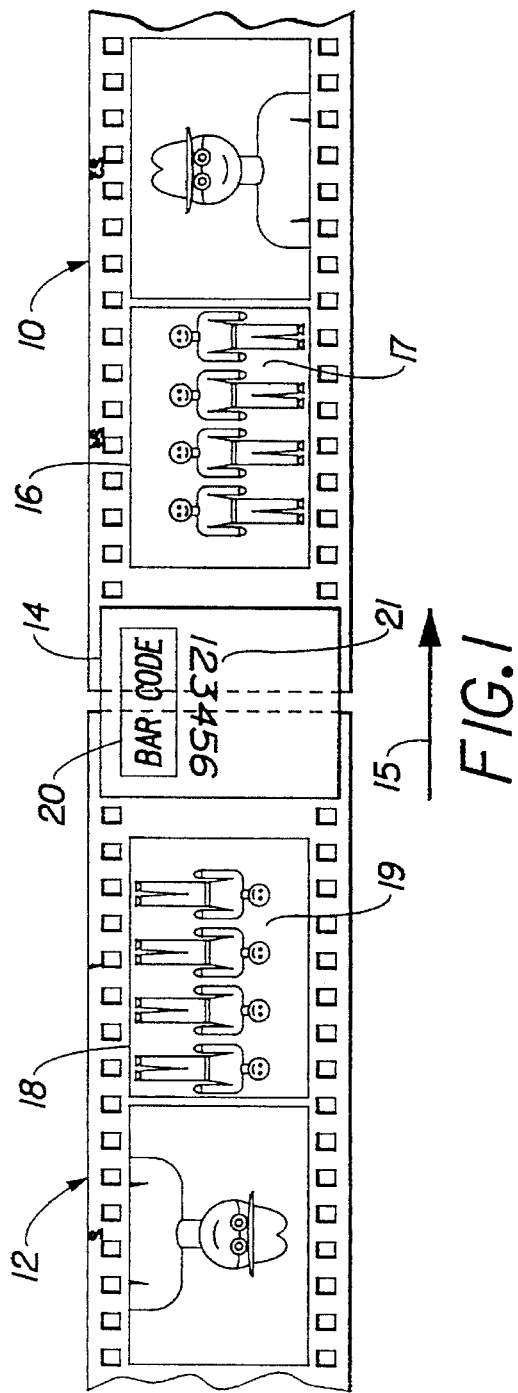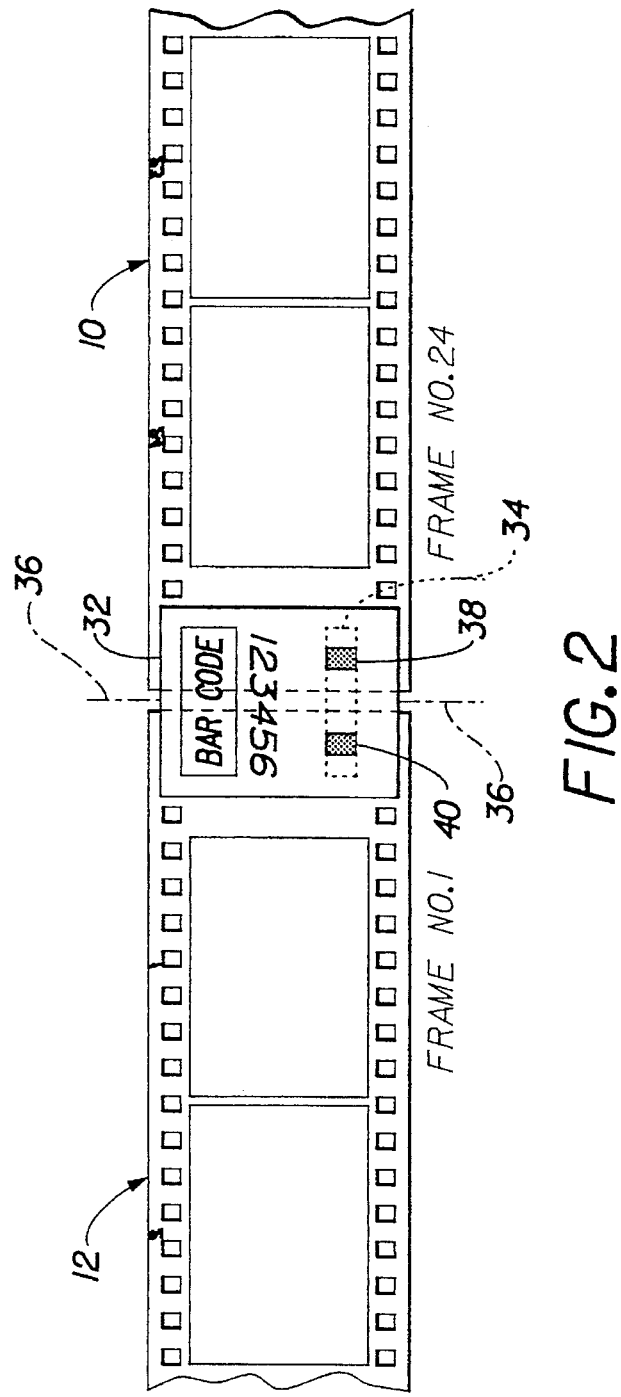

FIG. 3

| LEFT | RIGHT | |
|---|---|---|
| NO DOTS ⬚ ⬚ | | NO DOTS IS THE DEFAULT VALUE WHICH CAN BE SET AT ONE OR TWO PRINTS EACH |
| ▓ | | ONE DOT IN THE LEFT SPACE IS TWO PRINTS EACH |
| | ▓ | ONE DOT IN THE RIGHT SPACE IS THREE PRINTS EACH |
| ▓ | ▓ | ONE DOT IN EACH POSITION MEANS SCENE INVERSION |

NOTE: WHEN THE SCENE INVERSION CODE IS USED THE PRINTER WILL AUTOMATICALLY PRINT THE DEFAULT VALUE SET IN THE PRINTER'S COMPUTER

FIG. 4

| LEFT | RIGHT | |
|---|---|---|
| NO DOTS ⬚ ⬚ | | NO DOTS IS THE DEFAULT VALUE WHICH CAN BE SET AT ONE OR TWO PRINTS EACH |
| ▓ | | ONE DOT IN THE LEFT SPACE IS TWO PRINTS EACH |
| | ▓ | ONE DOT IN THE RIGHT SPACE IS SCENE INVERSION ONE EACH |
| ▓ | ▓ | ONE DOT IN EACH POSITION IS SCENE INVERSION TWO EACH |

FIG. 5

| LEFT | RIGHT | |
|---|---|---|
| NO DOTS ⬚ ⬚ | | NO DOTS IS THE DEFAULT VALUE WHICH CAN BE SET AT ONE OR TWO PRINTS EACH |
| ▓ | | ONE DOT IN THE LEFT SPACE IS ONE PRINT EACH |
| | ▓ | ONE DOT IN THE RIGHT SPACE IS THREE PRINTS EACH |
| ▓ | ▓ | ONE DOT IN EACH POSITION MEANS SCENE INVERSION |

NOTE: WHEN THE SCENE INVERSION CODE IS USED THE PRINTER WILL AUTOMATICALLY PRINT THE DEFAULT VALUE SET IN THE PRINTER'S COMPUTER

METHOD FOR COMMUNICATING SCENE ORIENTATION OF CAMERA FILM TO PHOTO FINISHING EQUIPMENT

FIELD OF THE INVENTION

This invention relates generally to the field of image processing, and more particularly to a method for communicating the scene orientation of an exposed strip of photographic film to photo finishing equipment with a film-splicing label having label encoded information imprinted thereon for identifying film used in right hand or left hand load cameras, and to a film-splicing label encoded with indicia for identifying the scene orientation.

BACKGROUND OF THE INVENTION

When film is exposed in a conventional camera it is normally advanced from left to right. A film magazine can be loaded on the left hand side and wound in the normal wind direction, i.e. the first or lowest numbered frame is exposed first and the film is returned back into the magazine, after all the pictures are taken, or it can be wound in the reverse wind direction, in which the film is first extracted out of the magazine and returned to the magazine as each picture is taken, i.e. the first frame on which a picture is taken is the first frame wound onto the magazine and corresponds to the highest numbered frame. The film magazine may also be loaded on the right hand side of a camera and either normal wind or reverse wind film transport techniques may be used. Cameras which utilize right hand load and a reverse wind technique include the increasingly popular single use cameras (SUC's) where it is more economical and reliable to put the magazine on the right side and thus eliminate the rewinding mechanism. A right hand load camera causes the scene on the film to be inverted when it is printed by an optical printer because, by convention, the printer receives the lowest numbered end of the film first and prints from the lowest frame number on the film to the highest frame number.

As the film is advanced into the print gate of the printer, the negative is first scanned for classification. However, the printer has no way to detect if the scene is an inverted or normal scene. The knowledge of the image orientation of a scene has application for conventional optical printing since this information is critical to the exposure determining algorithms in the printer software. Automatic digital imaging applications, such as the production of compact discs containing photographic images, and index prints on such discs, digitally printed automatic album pages, etc., also require that the images be correctly oriented before the final output image format is generated. At present, the scene inversion information is normally manually inputted to the printer setup values and remains fixed until the operator changes it. If this value is set to the normal scene orientation setting, then all film is treated in like manner, even if it is right hand load. Therefore, the best exposure will not be given to right hand load film. It is desirable to provide a means to detect and automatically tell the printer if a roll of film is a left or right (inverted) hand load film so that the required algorithms in the printer software can be activated, and the images can be printed right side up for conventional prints or digital and other multi image media.

Normally photo finishing operators sort customer films into batches of similar film for processing. It is not usually possible for the operator to identify the scene orientation of film from a reloadable camera. However, when the film is from a single use camera it is readily identified because the camera itself is opened by the photo finisher to retrieve the magazine and thus the right hand load film can be separated from other film. Once the film is identified as right hand load film by the photo finisher the printer can be signaled accordingly. This is a slow and therefore costly procedure when done by hand for multiple rolls of film.

U.S. Pat. No. 4,659,213 discloses a method and apparatus for detecting image information which has been recorded on the marginal portion of a film negative sheet outside of the film image. The marginal information, such as bar codes, may be used during photographic printing so as to discriminate the front surface from the back surface and/or to discriminate the top edge of the film from the bottom edge. If the negative film is mounted in an inverse direction, the printing exposure amount and correction may be determined.

SUC's use normal film which can be readily identified as right hand load and sorted manually. There is a need for a way in which normal film, exposed in either left or right hand load cameras, can be encoded as to orientation and processed in existing photo finishing equipment at high speed and therefore at low cost.

U.S. Pat. No. 4,800,406 discloses a method and apparatus for creating and checking correlation between negatives and prints in photographic laboratories by joining adjacent pairs of filmstrips with splicing tapes bearing machine-readable control numbers that are unrelated to orientation and reproducing each of said numbers onto the print medium at the printing station.

U.S. Pat. No. 5,248,887 discloses a method and apparatus for determining the orientation of film by providing the strip of exposed film with a timing track along one of the longitudinal margins thereof. The track includes a sequence of three segments. A sensor detects the position and width of the segments to determine the orientation of the film and thus distinguishes that the emulsion side is correctly oriented and whether the first or last exposure was inserted as the leading end. Using suitable printers an incorrectly oriented film can be detected and inverted electronically so that the image can be printed with the correct orientation.

While the foregoing patents '213 and '887 describe a way in which to detect orientation of a filmstrip by using specially coded filmstrip and apparatus designed to detect such codes they require special film and increase the complexity of film processing and therefore increase the cost of making prints.

In the present application, the term "imaging" is used as a blanket term for techniques used to convert an image on a film into a format for viewing, such as optical printing or digital scanning for printing, video displaying or projecting, the term "imaging parameters" is used as a blanket term for those variables which can be set for photofinishing equipment, in order to produce a viewable image, such as scene orientation, subject classification, exposure determination and color, density and contrast determinations.

SUMMARY OF THE INVENTION

Briefly stated and in accordance with one aspect of the invention, a method for communicating scene orientation of an exposed strip of left or right hand load photographic film to photo-finishing equipment to enable imaging parameters to be set automatically includes the steps of splicing the trailing end of a first exposed strip of film to the leading end of a second exposed strip of film with a film-splicing label, and encoding said film-splicing label for left or right hand load of said second film.

In accordance with another aspect of this invention the method comprises feeding said spliced first and second films to a film-splicing label reader for reading said code and automatically setting the parameters for normal or inverted scene orientation.

In accordance with another aspect of this invention, the right hand load film is a single use camera film.

In accordance with another aspect of this invention, the method comprises encoding the label with print count information and automatically setting a printer to expose for inverted scene orientation in response to a selected print count code.

In accordance with another aspect of this invention there is provided, a label for splicing one strip of photographic film having images exposed thereon in one of a first scene orientation and a second scene orientation to another strip of photographic film for batch developing and imaging comprising, a first surface for attaching the label to strips of film, and a second surface having a relatively high resolution identification indicia printed thereon for identifying and distinguishing the strip of film in a batch from other strips of film in the batch, and a second lower resolution indicia printed thereon for identifying the scene orientation on the strip of film.

In accordance with another aspect of this invention, a method of splicing strips of film having photographic images exposed thereon according to one of a first scene orientation and a second scene orientation includes, providing a film-splicing label having a preprinted high resolution indicia thereon for uniquely identifying the strip of film, attaching the film-splicing label to the film in a film splicer by the application of heat and pressure to the label and the film, identifying the scene orientation of the film, and applying a second low resolution indicia to the film-splicing label identifying the scene orientation of the strip of film.

Accordingly, this invention provides improved image quality by knowing the scene orientation.

The novel aspects of this invention are set forth with particularity in the appended claims. The invention itself, together with further objects and advantages thereof may be more fully comprehended by reference to the following detailed description of a presently preferred embodiment of the invention taken in conjunction with the accompanying drawings.

BRIEF DESCRIPTION OF THE DRAWINGS

FIG. 1 illustrates an example of adjacent left and right hand load film strips spliced together with an encoded film-splicing label.

FIG. 2 illustrate a film-splicing label encoded with automatic print count (APC) information.

FIGS. 3, 4 and 5 are illustrations of alternative scene orientation codes.

DETAILED DESCRIPTION OF THE INVENTION

Figure 6:
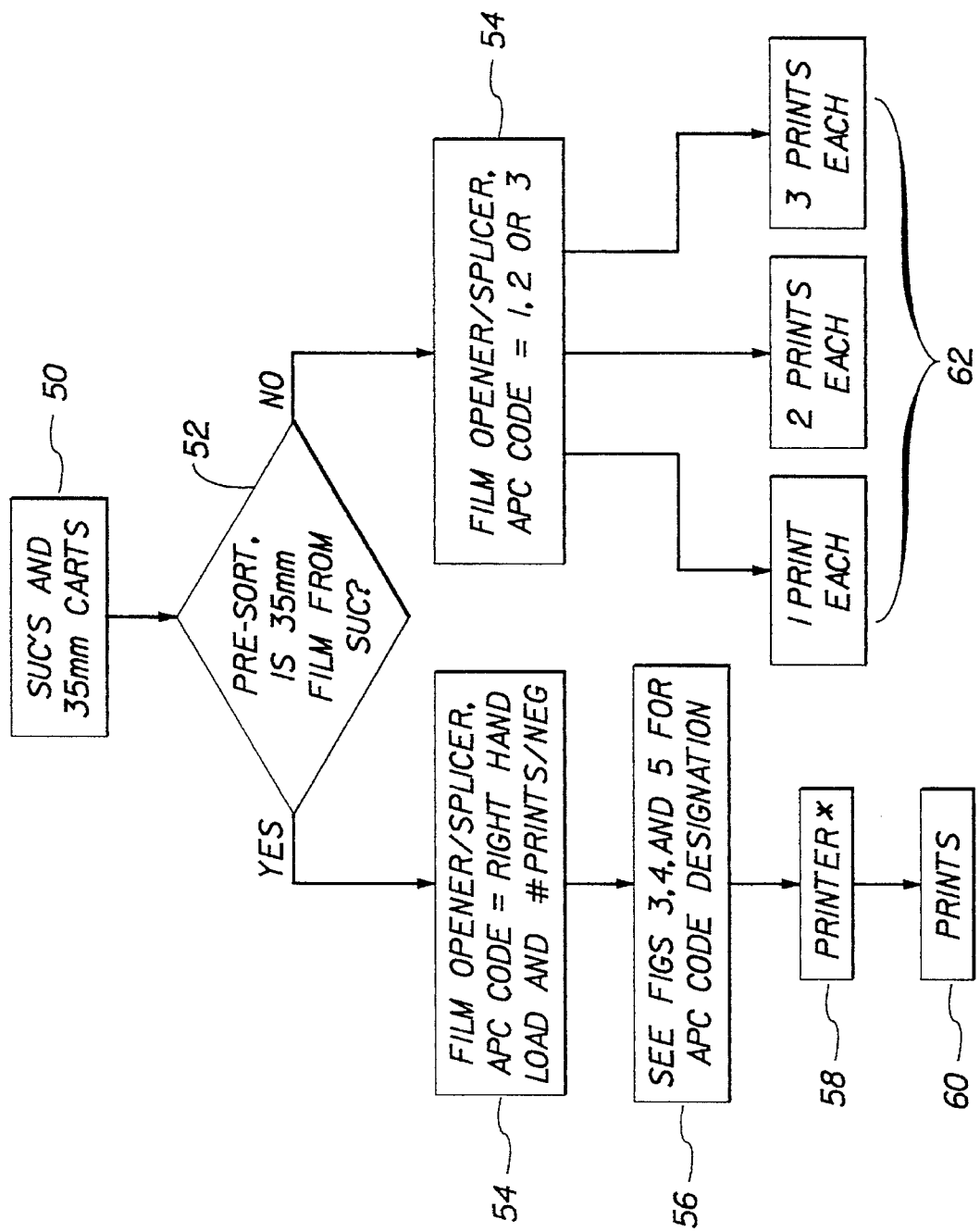
FIG. 6 is a block diagram of the control system (logic flowchart) for scene inversion detection.

Although different film size cameras can incorporate the methods and apparatus of this invention, the invention is disclosed as being embodied preferably in encoding film loaded in a magazine (cassette) for use with a 35 mm still camera. Because such a film and camera are well known, this description is directed in particular to photographic elements forming part of or cooperating directly with the disclosed embodiment. In a preferred embodiment of the invention the encoding method is described for use with single use cameras with the normal 35 mm format. However, such cameras using panoramic or telephoto formats and waterproof camera versions and cameras using other film sizes also fall within the invention. In the preferred embodiment the film is advanced from left to right in the conventional manner. It is to be understood however, that the encoding method is readily adaptable for cameras in which the film is advanced from right to left, and that other elements not specifically shown or described may take various forms known to persons of ordinary skill in the art.

Referring to FIG. 1, an exposed strip of a first film 10, a left hand load film, is shown spliced to an exposed strip of a second film 12, a right hand load film, by means of a film-splicing label 14. Both films are viewed with the emulsion side up and the splicing label 14 is mounted on the emulsion side of the films. The spliced films are fed to photo finishing equipment, for example a printer, in the direction of the arrow 15. The trailing end of film 10 has the highest number frame 16, for example exposure 24 of a 24 exposure 35 mm film, shown with normal scene orientation of the image 17. This trailing end is spliced to the leading end of film 12 which shows the lowest numbered frame 18, for example exposure 1 of a 24 exposure 35 mm film, with inverted scene orientation of the image 19. The splicing label is adhesively attached to the ends of the film to join them together by means of an automatic splicing machine, for example, the Ultima Day Light Splicer manufactured by Standard Manufacturing of Chicopee, Mass.

A tape of film-splicing labels, coated with heat activated adhesive on one side, is fed to a splicer where contact is made with adjacent rolls of film under the splice head. Pressure and heat is used to adhesively attach the label to the adjacent rolls of film. The temperature of the splice head is preferably about 350° F. (177° C.). The adhesive is compatible with subsequent developing and imaging operations. Such labels are usually provided with a preprinted machine readable and/or eye readable code, for example, a sequential bar code 20 or an eye readable number 21. Such codes can be used to automatically correlate the film with the customers envelope number so that the processed film and prints can be matched after printing is completed. The spliced together film strips then go to a film developer which develops the exposed frames. The developed films are then supplied to the appropriate imaging equipment, for example, a printer.

The film-splicing label 14 can be further encoded and used to identify the film 12 as a right hand load film by any suitable means which can signal a compatible printer with the information and activate the parameters, such as the exposure determining algorithms in the printer software, to expose for an inverted image. Conversely the label can be encoded for left hand load film if the next succeeding film in a roll of spliced films is left hand load and thus signal to the printer for a normal image. Any machine-readable or optical-readable coding system can be used which is compatible with the equipment used for splicing, developing and printing.

The film-splicing label can also be encoded and used to signal automatic digital imaging equipment to activate the parameters for the correct scene orientation.

In a preferred embodiment of the invention the scene orientation code is added to the film-splicing label immediately following the splicing step. Printing high resolution indicia such as bar codes or number sequences on the film-splicing label in the splicer would require expensive printing and scanning equipment to provide the printing quality and reading capability needed for reliably reading the code at the high through put speeds encountered during the splicing operation. A low resolution, robust encoding method requiring inexpensive printing and reading equipment for providing high speed printing and reliably reading the code is provided by modifying known automatic print count code (APC) systems to automatically signal the scene orientation of an exposed filmstrip to imaging equipment.

Normally operators of film-splicing and imaging equipment, for example a printer, sort the customers film into batches with the same print count requirements, e.g. all single prints or all double prints, and program the printer accordingly. Systems are well known which allow the operator to encode the film-splicing label with an APC code which signals the printer the number of prints required for each strip of film. For efficiency, coding for a print count is normally done with separated, large batches of film with the same print count requirements. However, it can readily be used with mixed batches of film with different print count requirements.

One such system for 35 mm color film is the Kodak Splice Print Count Reader which is installed on a Kodak 2610 Color Printer or Kodak 3510 Color Printer (all manufactured by Eastman Kodak Co., Rochester, N.Y.) and used in conjunction with the Ultima Day Light Splicer. This system requires that the printer be set for first-frame-first operation. This system performs the function of adjusting the number of prints per frame exposed by the printer, for a particular customer order. This eliminates the need for the photo finisher to segregate his 1-, 2-, 3-, and 4-each orders and multi-print orders can flow through with normal orders.

In general the APC code is under-utilized because most people require only 1 or 2 prints, not 3 or 4 prints. It is an object of this invention to utilize the APC code to indicate normal or inverted scene orientation by modifying the code and setting the parameters to encode for orientation and/or print count.

The film-splicing label for use with this invention is provided with an area reserved for adding an APC code in the splicer which is normally used to signal to a printer the number of prints of each frame which are required for the succeeding strip of film. Such a label can also carry additional preprinted codes as described above.

Referring to FIG. 2, there is shown a preferred method of coding for scene orientation in which a film-splicing label 32 joins a first film 10 and a second film 12 together. The APC code is located on a nominal print area 34 of the label and is automatically centered on the mid-point 36 between the last frame of the first film and the first frame of the second film and is utilized to encode for the scene orientation of the second film. Such films are usually contained in a large multi-film roll of spliced films which can be continuously and rapidly fed to an automatic printer. The printer senses the code for each label and activates the algorithms in the printer software for the selected scene orientation.

The APC code is an operator selected binary, two dot code placed on the film-splicing label when the splice is made. It consists of the area 34, which can be scanned for the presence or absence of a pattern of relatively large, low resolution indicia, for example, dark dots or rectangular patches. The specific locations for the dots are established by convention and are made at, for example, locations 38, 40 on either side of and equidistant from the mid-point of the film-splicing label. Such low resolution indicia have a minimum size for detection by a reader and a maximum for fitting in the allotted area of the splicing label, for example, between about 0.05 in. (1.25 mm) square and about 0.375 in. (9.5 mm) square.

The code is imprinted on the film-splicing label by a printer such as an impact printer, for example a dot matrix printer, which can imprint a dark dot or rectangular patch of sufficient density and dimensions as required for sensing by an optical reader. Such a reader is installed in the Kodak Splice Print Count Reader and requires the difference in visual density between the indicia and splice tape to equal or exceed 0.5 on a visual scale.

Typically the labels are provided in the form of a splice tape of a standard width, for example 0.5 in. (13 mm), 0.75 in. (19 mm.) or 1 in. (25 min.) In a 1 in. (25 mm) wide label the area 34 measures, for example, 0.8 in. (20 mm) wide by 0.09" (2.3 mm) high and each rectangular patch measures 0.1 in. (2.5 mm) wide by 0.09 in (2.3 mm) high.

FIGS. 3, 4 and 5 illustrate three of several different patterns that can be used for the scene inversion code together with the print count requirement.

In FIG. 3, the absence of any dots is the default value which can be set so that the print count is one or two prints each. One dot in each position sets the printer for scene inversion. By setting the default value to one print each the scene inversion code will automatically print one print each. By setting the default value to two prints each the scene inversion code will automatically print two prints each. In this version of the code, one dot on the left space will print two prints each for normal scene orientation, one dot in the right space will print three prints each for normal scene orientation and depending on the setting of the default value, no dots will print one or two prints for normal scene orientation.

In FIG. 4, the absence of any dots is the default value which can be set so that the print count is one or two prints each. One dot in each position sets the printer for scene inversion and two prints each. In this version of the code, one dot on the left space will print two prints each for normal scene orientation, one dot in the right space will print one print each for scene inversion and depending on the setting of the default value, no dots will print one or two prints for normal scene orientation.

In FIG. 5, the absence of any dots is the default value which can be set so that the print count is one or two prints each. One dot in each position sets the printer for scene inversion. By setting the default value to one print each the scene inversion code will automatically print one print each. By setting the default value to two prints each the scene inversion code will automatically print two prints each. In this version of the code, one dot on the left space will print one print each for normal scene orientation, one dot in the right space will print three prints each for normal scene orientation and depending on the setting of the default value, no dots will print one or two prints for normal scene orientation.

The invention is not limited to these patterns of dots as various other patterns can be envisaged by those skilled in the field and used for specific demands.

Referring now to FIG. 6, a block diagram of a typical control system (logic flowchart) for sorting of films for scene inversion detection is shown. Film magazines from 35 mm left hand load cameras and 35 mm right hand load SUC cameras are collected in cans 50 and presorted into separate carts or bins 52 for each type of film. SUC films requiring scene inversion are selected and sent to a film opener/splicer 54 where each film is extracted and spliced to another film by adhesively attaching a film-splicing label adjacent to the first numbered frame of the SUC film and the last numbered frame of the other film. The label is then encoded with the APC code for scene inversion and prints per negative by a printer according to the designated pattern 56 (see FIGS. 3, 4 and 5). The roll of spliced films formed by splicing successive films is fed to a printer/reader 58 which senses the APC code, activates the algorithms in the printer software for scene inversion and prints the selected number of prints 60. Non-SUC or normal left hand load films are selected and sent to the film/opener splicer 54 where each film is extracted and spliced to another film by adhesively attaching a film-splicing label adjacent to the first numbered frame of the normal film and the last numbered frame of the other film. The label is then encoded with the APC code for the selected number of prints to be printed 62, for example 1, 2 or 3 prints, with normal scene orientation.

This invention can also be used for other types of photo finishing equipment, for example, automatic digital imaging applications, such as the production of compact discs containing photographic images, and index prints on such discs, digitally or conventionally printed automatic album pages, etc., which also require that the images be correctly oriented before the final output image format is generated. It is envisaged also that this invention can be used with non-magazine loaded types of film.

According to this invention there is provided a system which can be used with automatic photo finishing equipment for printing multiple rolls of film and automatically sensing the scene orientation of each film. This invention provides an advantageous method for a photo finisher to control and provide optimal print exposure parameters for the correct scene orientation. This is achieved by encoding a film-splicing label with an APC code pattern selected to indicate whether successive lengths of spliced film have normal or inverted scene orientation. Existing photo finishing equipment can be readily adapted to use this method and increased print quality and productivity is achieved. As SUC's become more prevalent in the market place, indication of the film scene orientation becomes more valuable.

While the invention has been described in connection with a presently preferred embodiment thereof, those skilled in the art will recognize that many modifications and changes may be made therein without departing from the true spirit and scope of the invention, which accordingly is intended to be defined solely by the appended claims.

Parts List:
10 . . . first film
12 . . . second film
14 . . . film splicing label
15 . . . arrow
16 . . . highest number frame
17,19 . . . image
18 . . . lowest numbered frame
20 . . . bar code
21 . . . eye readable number
24 . . . exposure
32 . . . film splicing label
34 . . . print area
36 . . . mid-point
38,40 . . . locations
50 . . . carts
52 . . . bins
54 . . . opener/splicer
56 . . . designated pattern
58 . . . printer/reader
60 . . . prints
62 . . . prints to be printed

What is claimed is:

1. A method for communicating scene orientation of an exposed strip of left or right hand load photographic film to photo finishing equipment to enable imaging parameters to be set automatically comprising the steps of:

splicing the trailing end of a first exposed strip of film to the leading end of a second exposed strip of film with a film-splicing label; and encoding said film-splicing label for left or right hand load of said second film.

2. A method according to claim 1, further comprising the step of:

feeding said spliced first and second films to a film-splicing label reader for reading said code and automatically setting the parameters for normal or inverted scene orientation.

3. A method according to claim 2, further comprising the step of:

setting the parameters of a photographic printer to expose for normal or inverted scene orientation.

4. A method according to claim 2, further comprising the step of:

setting the parameters to correct the scene orientation for digital imaging applications.

5. A method according to claim 2, comprising automatically setting the parameters for inverted scene orientation when the second exposed strip of film is a right hand load film.

6. A method according to claim 5, in which the second exposed strip of film is a single use camera film.

7. A method according to claim 2, comprising automatically setting the parameters for normal scene orientation when the second exposed strip of film is a left hand load film.

8. A method according to claim 1, further comprising the step of:

encoding the film-splicing label for right hand load.

9. A method according to claim 1, further comprising the step of:

encoding the film-splicing label for left hand load.

10. A method according to claim 2, in which the reader is a splice print count reader.

11. A method according to claim 10, further comprising the step of:

encoding the film-splicing label with a print count code for automatically adjusting the number of prints per frame to be exposed by a printer.

12. A method according to claim 11, comprising automatically setting the printer to expose for inverted scene orientation in response to a selected print count code.

13. A method according to claim 11, comprising automatically setting the printer to expose for normal scene orientation in response to a selected print count code.

14. A method according to claim 10, further comprising the step of:

optically reading the film-splicing label code.

15. A method according to claim 14, in which the film-splicing label code comprises a pattern of spaces and low resolution darkened indicia, compatible with photo finishing operations encountered, located on a reserved area of the label.

16. A method according to claim 15, in which the inverted scene orientation code comprises a pattern of optically readable spaces and darkened indicia imprinted on the film-splicing label.

17. A method according to claim 16, in which the inverted scene orientation code comprises a pattern of optically readable darkened indicia imprinted on the film-splicing label.

18. A method according to claim 15, comprising selecting the number of prints per frame to be exposed by the printer in response to the code.

19. A method according to claim 1, further comprising the step of:
   imprinting the code on the label immediately following the splicing step.

20. A method for communicating scene orientation of an exposed strip of right hand load photographic film to photo finishing equipment to enable imaging parameters to be set automatically comprising the steps of:
   splicing the trailing end of an exposed strip of film to the leading end of an exposed strip of right hand load film with a film-splicing label;
   encoding said film-splicing label for right hand load film; and
   feeding said spliced films to a film-splicing label reader for reading said code and automatically setting the parameters for inverted scene orientation.

21. A method according to claim 20, in which the reader is a splice print count reader.

22. A method according to claim 21, further comprising the step of:
   encoding the film-splicing label with print count information for automatically setting the parameters of a photographic printer to expose for the inverted scene orientation.

23. A method according to claim 21, further comprising the step of:
   encoding the film-splicing label with print count information for automatically setting the parameters to correct for inverted scene orientation in digital imaging applications.

24. A label for splicing one strip of photographic film having images exposed thereon in one of a first scene orientation and a second orientation to another strip of photographic film for batch developing and imaging comprising:

a first surface for attaching the label to strips of film; and a second surface having a relatively high resolution identification indicia printed on a first area thereof for identifying and distinguishing the strip of film in a batch from other strips of film in the batch, and a second lower resolution indicia printed on a second, separate area thereof for identifying the scene orientation on the strip of film.

25. A label according to claim 24, in which said first surface comprises a layer of heat activated adhesive thereon with adhesion characteristics compatible with the developing and imaging operations.

26. A method of splicing strips of film having photographic images exposed thereon according to one of a first scene orientation and a second scene orientation comprising:
   providing a film-splicing label having a preprinted high resolution indicia thereon for uniquely identifying the strip of film;
   attaching the film-splicing label to the film in a film splicer by the application of heat and pressure to the label and the film;
   identifying the scene orientation of the film; and
   applying a second low resolution indicia to the film-splicing label identifying the scene orientation of the strip of film.

27. The label according to claim 24, in which the lower resolution indicia are optically readable.

28. The label according to claim 24, in which the lower resolution indicia comprise a pattern of optically readable spaces and darkened indicia.

29. The label according to claim 28, in which the darkened indicia are selected from dots and rectangular patches.

30. The label according to claim 29, in which the high resolution identification indicia is a bar code.

31. The label according to claim 28, in which the lower resolution indicia comprise a two bit pattern of optically readable spaces and darkened indicia.

32. The label according to claim 31, in which the darkened indicia are selected from dots and rectangular patches.

33. The label according to claim 24, in which the high resolution identification indicia is a bar code.

* * * * *